(12) United States Patent
Sundrani

(10) Patent No.: US 9,009,405 B2
(45) Date of Patent: Apr. 14, 2015

(54) METHODS AND SYSTEMS FOR INSTANTANEOUS ONLINE CAPACITY EXPANSION

(75) Inventor: Kapil Sundrani, Bangalore (IN)

(73) Assignee: LSI Corporation, San Jose, CA (US)

(*) Notice: Subject to any disclaimer, the term of this patent is extended or adjusted under 35 U.S.C. 154(b) by 393 days.

(21) Appl. No.: 13/459,311

(22) Filed: Apr. 30, 2012

(65) Prior Publication Data

US 2013/0290626 A1    Oct. 31, 2013

(51) Int. Cl.
- *G06F 12/00* (2006.01)
- *G06F 13/00* (2006.01)
- *G06F 13/28* (2006.01)
- *G06F 11/10* (2006.01)
- *G06F 3/06* (2006.01)

(52) U.S. Cl.
CPC .......... *G06F 11/1096* (2013.01); *G06F 3/0665* (2013.01); *G06F 3/0644* (2013.01); *G06F 3/0689* (2013.01)

(58) Field of Classification Search
CPC . G06F 3/0689; G06F 11/2094; G06F 3/0665; G06F 11/0727; G06F 3/0644; G06F 3/0653
USPC ........................................................ 711/114
See application file for complete search history.

(56) References Cited

U.S. PATENT DOCUMENTS

| 6,718,436 B2 | 4/2004 | Kim et al. |
| 7,747,835 B1 * | 6/2010 | Chatterjee et al. ............ 711/114 |

OTHER PUBLICATIONS

Jose Luis Gonzalez and Toni Cortes, Increasing the Capacity of RAID5 by Online Gradual Assimilation, ACM (SNAPI '04 Proceedings of the International Workshop on Storage Network Architecture and Parallel I/Os), Sep. 30, 2004, pp. 1-8.

* cited by examiner

*Primary Examiner* — Charles Rones
*Assistant Examiner* — Sidney Li
(74) *Attorney, Agent, or Firm* — Suiter Swantz pc llo

(57) ABSTRACT

The disclosure provides instantaneous, vertical online capacity expansion (OCE) for redundant (e.g., RAID-5, RAID-6) and non-redundant (e.g., RAID-0) arrays. The new OCE technique implements vertical expansion instead of the horizontal expansion techniques implemented in current OCE techniques. The vertical expansion treats any new addition of storage as an extension of the capacity of the preexisting physical drives in order to avoid having to rewrite the data blocks of the original, preexisting storage devices. Vertical RAID expansion is implemented by installing one or more new physical storage devices in a device or partition configuration that corresponds to the physical configuration of the preexisting volume and loading new metadata received through the user interface into the firmware of the RAID controller to define the configuration of the expanded volume.

20 Claims, 4 Drawing Sheets

METHODS AND SYSTEMS FOR INSTANTANEOUS ONLINE CAPACITY EXPANSION

TECHNICAL FIELD

The present disclosure relates generally to RAID storage arrays for computer systems and, more particularly, to methods and systems for vertical expansion of RAID storage arrays without having to rewrite the data blocks stored on the preexisting storage devices of the RAID volume.

BACKGROUND

Data storage requirements are continually increasing in day-to-day computer operations. A redundant array of independent disks (RAID) can be used to spread a large logical storage volume over an array of physically separate storage devices. Various RAID techniques provide for redundant and mirrored storage to avoid data loss through drive failure or data corruption. A RAID volume is typically divided into a number of stripes that each extend across multiple physical devices to create a large logical volume that extends over a partial storage array or an entire storage array. An "XOR" parity system is typically used to store redundant data in each stripe. The parity data can be used to recreate the data stored on any corrupted block of the strip. The parity blocks may be distributed among the physical drives, and mirrored in multiple drives, to minimize the risk of data loss through corruption of data blocks or failure of any physical drive.

As the need for computer data storage in a system increases, there is a need for adding more drives to the original, preexisting RAID data storage array. Expanding the logical volume capacity by adding one or more drives to a preexisting RAID storage array without taking the storage array offline or powering down the storage system is known as Online Capacity Expansion (OCE). OCE can therefore be thought of as the expansion of RAID capacity by adding one or more new storage devices (e.g., disk drives) to the preexisting array without having to power-down or reboot the host computer system. This allows the computer to continue operating with the preexisting storage devices remaining accessible during the expansion process.

There are techniques currently available for OCE but there is always a risk of the data becoming corrupted during the OCE process due to the extended time required to complete the OCE process. For example, the data can be become corrupted if a controller failure, a disk failure or a power failure occurs while OCE is being performed. Larger RAID volumes require longer OCE time, which increases the time period during which data corruption can occur. Another problem with the current OCE methods is that the processing overhead for the OCE process degrades the performance of host IO requests during the OCE process.

These problems emanate from the fact that current OCE techniques involve changing the layout of the entire RAID volume during the OCE process, which requires rewriting the data blocks on the original, pre-existing RAID storage devices. As the pre-existing storage devices are presumably full to near capacity at the time of volume expansion, rewriting all of the data blocks of the preexisting storage devices into the new logical layout consumes large amounts of data processing capacity over long processing periods. There is, therefore, a continuing need for OCE techniques that do not rewrite the data blocks on the pre-existing storage devices as part of the OCE process.

SUMMARY

The disclosure provides methods and systems for instantaneous online capacity expansion (OCE) of redundant array of independent disks (RAID) computer storage arrays. The instantaneous OCE mechanism overcomes the shortcomings of existing OCE techniques, which require rewriting the data blocks stored on the original, preexisting storage devices as a necessary part of the OCE process. The disclosure provides new vertical RAID expansion mechanisms for redundant (e.g., RAID-5, RAID-6) and non-redundant (e.g., RAID-0) volumes.

Vertical OCE expansion increases the logical volume size without changing the logical layout of the original, preexisting volume thereby providing for efficient instantaneous expansion. The instantaneous OCE technique of the present disclosure therefore solves the existing problems of controller and disk failures during OCE and takes away the performance penalty that is induced by the current methods.

It is to be understood that both the foregoing general description and the following detailed description are exemplary and explanatory only and are not necessarily restrictive of the disclosure as claimed. The accompanying drawings, which are incorporated in and constitute a part of the specification, illustrate embodiments of the disclosure and together with the general description, serve to explain the principles of the disclosure.

BRIEF DESCRIPTION OF THE DRAWINGS

The numerous advantages of the disclosure may be better understood with reference to the accompanying figures in which.

DETAILED DESCRIPTION OF ILLUSTRATIVE EMBODIMENTS

Figure 1:
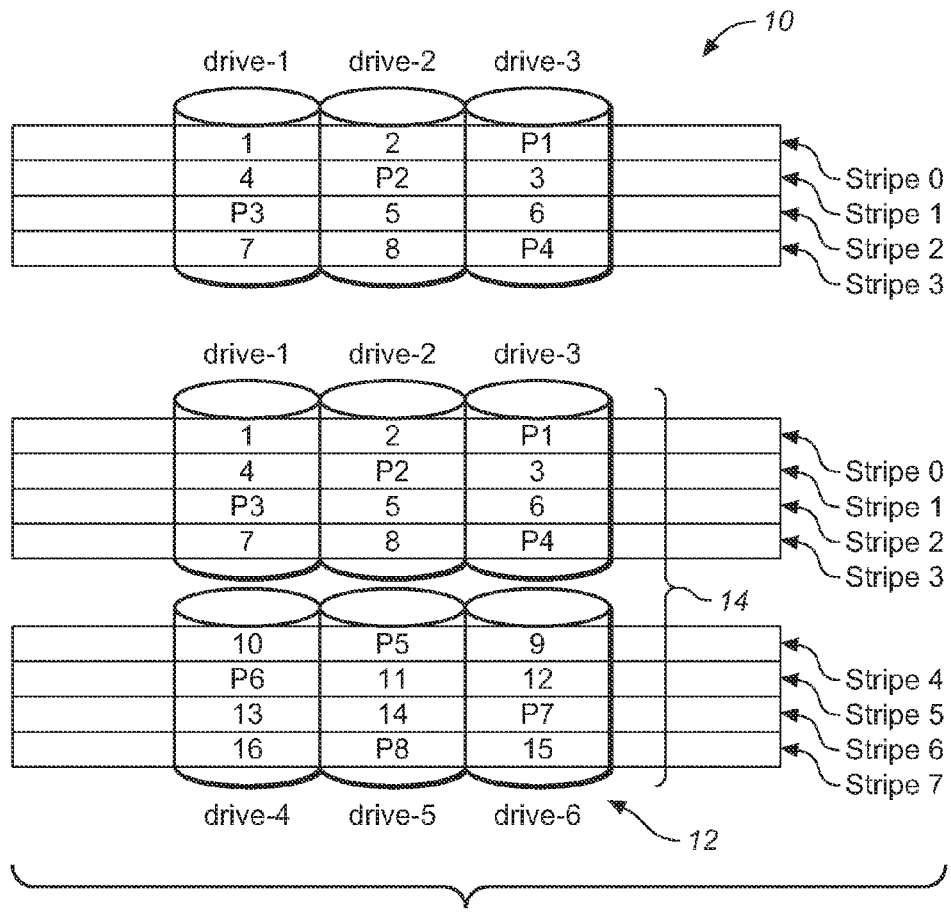
FIG. 1 is a data block layout diagram illustrating vertical OCE of a redundant RAID-5 volume.

The disclosure may be embodied in new methods and systems for instantaneous online capacity expansion (OCE) of RAID storage arrays. The disclosure may be embodied in vertical OCE techniques for redundant (e.g., RAID-5, RAID-6) and non-redundant (e.g., RAID-0) arrays. The new OCE techniques implement vertical expansion instead of the horizontal expansion techniques implemented in current OCE techniques. The vertical expansion treats any new addition of storage as an extension of the capacity of the preexisting physical devices in order to avoid having to rewrite the data blocks of the preexisting physical devices. Vertical RAID expansion is implemented by installing one or more new physical storage devices in a device or partition configuration that corresponds to the physical configuration of the preexisting volume. In addition, new metadata received through the user interface is loaded into the firmware of the RAID controller to define the configuration of the expanded volume. Because the new physical storage corresponds to the physical configuration of the preexisting volume, the updated RAID configuration is vertically expanded through metadata uploaded to the RAID firmware defining larger storage sizes for the preexisting storage devices. The RAID controller otherwise continues to operate as previously configured.

In current OCE systems, the data blocks are relocated to new locations in the logical layout thereby necessitating parity re-calculation with the new data layout. Essentially, all of the data on the existing volume is read and re-written into the new logical layout. Even though the volume is kept online and is accessible to the host while the OCE occurs, the current OCE technique is a computationally intensive and time consuming process that degrades the performance of the host IO requests while the OCE is performed.

The instantaneous OCE mechanism expands a RAID logical volume without rewriting the data blocks of the original, preexisting storage devices thereby taking away all problems experiences with current OCE techniques. The disclosure includes, but is not limited to, two different techniques for instantaneous OCE depending upon the RAID level of the volume under OCE. Specific examples include, but do not limit the disclosure to, a first instantaneous OCE technique for redundant RAID arrays and a second instantaneous OCE technique for non-redundant RAID arrays. To implement instantaneous OCE, RAID volumes that provide for redundancy of data (e.g., RAID-5, RAID-6, etc.) utilize the same number of physical drives as the original, preexisting volume. For example, if the user wants to perform an instantaneous online expansion of a 3 drive RAID-5 volume, the user utilizes another 3 drives resulting for a total of 6 drives in the expanded RAID-5 array. This is needed because the disclosure treats the expansion as a logical extension of the volume and expands the volumes vertically instead of the traditional width expansion employed in conventional OCE methods.

It will be appreciated that the disclosure does not alter the logical layout of the original, preexisting storage devices in the RAID volume. Instead of expanding the volume width-wise as in current OCE, the disclosure expands the logical layout of the volume vertically. As a result, a number of additional physical drives equal to the number of preexisting physical drives already present in the volume are needed to expand a redundant RAID array instantaneously. This is because of the redundancy requirements of the volume. As all logical to physical mapping is managed within the firmware managing the RAID volume, there is no change for the user in terms of functionality. All that is needed is to manage the configuration change and update the RAID configuration metadata to reflect the new logical mapping.

Since redundancy is not a requirement for RAID-0 volumes, the disclosure provides yet another fast mechanism of OCE for non-redundant RAID volumes. For non-redundant RAID arrays, the newly added physical drive(s) is broken into multiple logical partitions equal to the number of preexisting physical drives. Each partition of the added drive is then allocated to a respective preexisting physical drive and treated as a vertical expansion of its associated physical drive. For example, a new drive that is being added for OCE to a 3 drive RAID-0 array is broken into 3 logical partitions, which is equal to the number of preexisting physical drives in the volume. Each logical partition of the new drive is then allocated to a respective preexisting physical drive and is essentially treated as an extension to its associated preexisting physical drive. The "extended" physical drive map is loaded into and maintained by the firmware and any access to the extended volume is translated by the firmware so that the access is made to the new drive at the correct block.

Reference will now be made with reference to accompanying drawings. FIG. 1 is a data block layout diagram illustrating vertical OCE of a preexisting RAID-5 volume 10. The new method of instantaneous OCE expands capacity of the storage without changing the logical layout of data stored on the preexisting drives of the volume. In this example, the preexisting volume 10 includes drive-1 through drive-3. These drives are divided into four stripes, stripe-0 through stripe-3, with each stripe including a block on each drive. Each stripe includes two data blocks and one parity block, while each drive includes at least two data blocks and at least one parity block providing for distributed redundancy. More specifically, stripe-0 includes data block-1 on drive-1, data block-2 on drive-2, and parity block-1 on drive-3. Stripe-1 includes data block-4 on drive-1, parity block-2 on drive-2, and data block-3 on drive-3. Stripe-2 includes parity block-3 on drive-1, data block-5 on drive-2, and data block-6 on drive-3. Stripe-3 includes data block-7 on drive-1, data block-8 on drive-2, and parity block-4 on drive-3.

To implement instantaneous OCE, the added drives 12 are integrated into the RAID-5 volume to create the augmented volume 14. The number of added drives 12 is equal to the number of preexisting drives 10, in this example there are 3 preexisting drives 10 and 3 added drives 12 for an augmented volume 14 containing a total of 6 drives. The layout of the preexisting volume 10 is unchanged. The added drives 12 are divided into four stripes similar to the preexisting volume 10 except that the logical blocks of the added drives are organized as vertical extensions of the logical blocks of the preexisting drives. However, newly added capacity may be of different capacity when compared to the capacity of the preexisting drives (thereby having different numbers of stripes when compared to the number of stripes in the preexisting volume 10). To provide a specific example, the added drives are divided into 4 stripes including stripe-4 with data block-10 on drive-4, parity block-5 on drive-5, and data block-9 on drive-6. Stripe-5 includes parity block-6 on drive-4, data block-11 on drive-5, and data block-12 on drive-6. Stripe-6 includes data block-13 on drive-4, data block-14 on drive-5, and parity block-7 on drive-6. Stripe-7 includes data block-16 on drive-4, parity block-8 on drive-5, and data block-15 on drive-6.

As instantaneous OCE requires only a re-adjustment of metadata of the volume under OCE, the RAID system accounts for the extra space added with the addition of new drives. The IO processing after OCE continues with the added capacity as if the volume has additional drives but while processing the IO requests, the RAID system accounts for the vertical addition. To handle the IO requests, the RAID system manages the added capacity as if the blocks added with each added physical drive have been added to each of the existing physical drives. The actual physical drive that each IO request goes to is then determined by the physical drive size of the original physical drive plus its associated newly added physical drive.

Figure 2:
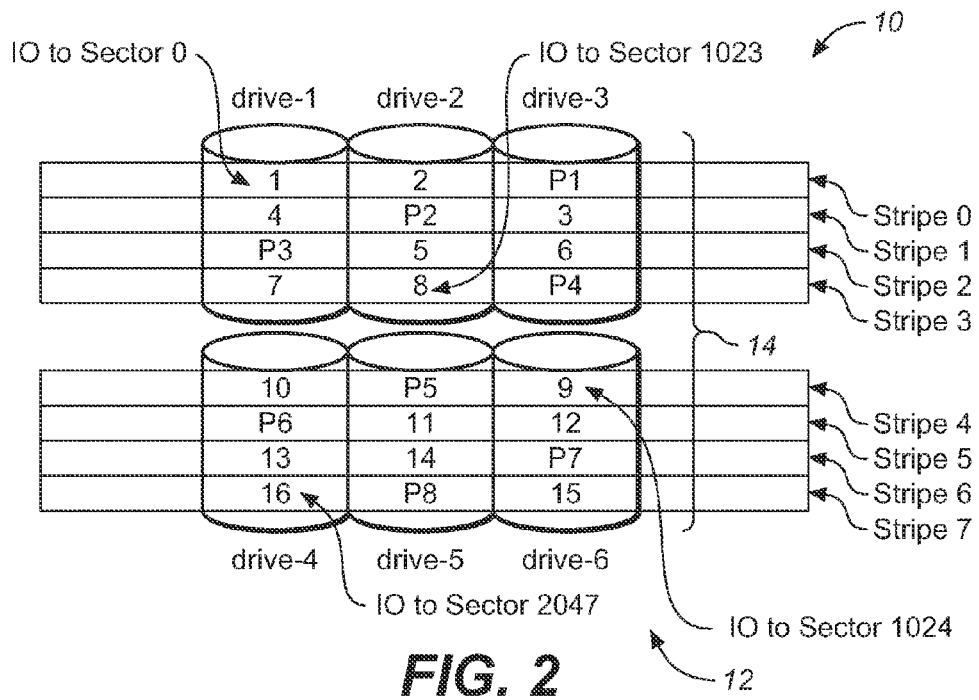
FIG. 2 is a data block layout diagram illustrating IOcontinuity in the vertically expanded RAID-5 volume of FIG. 1.

FIG. 2 shows the example of the 3 drive RAID-5 volume 10 shown on FIG. 1 vertically expanded to the 6 drive RAID-5 volume 14. To illustrate this protocol, consider an example in which each drive contains 512 sectors of 512 bytes each and a stripe size of 64 k. This results in four stripes in the RAID-5 volume 10 before the capacity expansion, and eight stripes in the expanded RAID-5 volume 14, as shown in FIG. 2. When a logical IO request is broken down into physical requests for the expanded volume 14, the RAID controller assumes that there are only 3 physical drives with the capacity of each existing drive having doubled. FIG. 2 illustrates the processing of IO requests after the capacity expansion.

In this particular example, the preexisting volume 10, before OCE, had a total of 1024 sectors of data capacity. After OCE, the expanded volume 14 has a total of 2048 sectors of data capacity. If an IO request is issued to any of the first 1024 sectors, the preexisting set of 3 drives 10 service the IO request. If an IO request is directed to the new 1024 sectors, the newly added 3 drives 12 service the IO request, as shown FIG. 2. As a first example, an IO request to logical sector 1023 falls on physical drive-2's sector 511. An IO request to the next logical sector 1024 would fall on physical drive-3's sector 512. Since the original size of drive 3 is only 512 sectors (sector 0-sector 511), the request is actually sent to block-0 of the new added drive-6 located below drive-3, which is now referenced as logical data block-9 of the expanded volume 14. That is, the first logical data block of the added volume 12, logical data block-9 on sector 0 in drive-6, follows the last logical data block of the preexisting volume 10, logical data block-8 on sector 511 in drive-2 because the newly added drives are treated as a vertical expansion of the preexisting drives. IO requests falling on the following data blocks are then mapped to the added volume 12 using the same RAID-5 protocol, culminating with sector 2047 falling on sector 511 of drive-4, as shown in FIG. 2.

Figure 3:
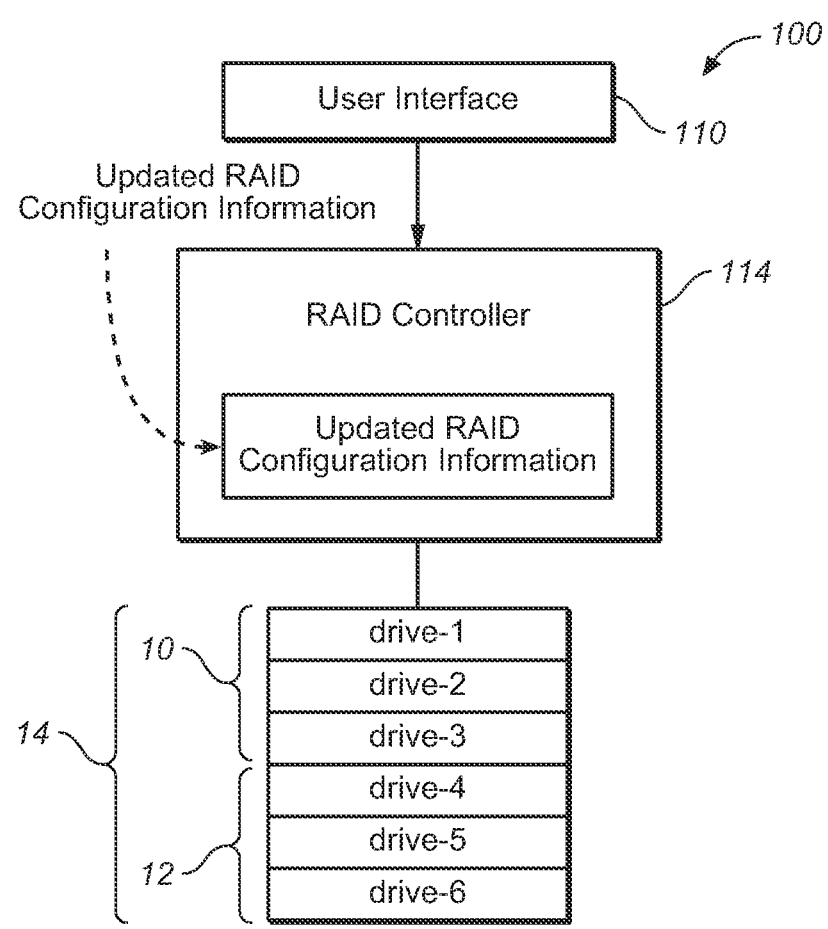
FIG. 3 is a functional block diagram of a computer system implementing vertical OCE of a RAID-5 array.

FIG. 3 is a functional block diagram of a computer system 100 implementing vertical OCE of the RAID-5 array. The computer system 100 includes a user interface 110 and a RAID controller 114. It is contemplated that RAID controller may include software and/or firmware which may contain metadata describing a structure of the data on the RAID array 14, which has been expanded through OCE from the original, preexisting volume 10 through the addition of the new drives 12. Consistent with FIGS. 1-2, FIG. 3 illustrates an expanded volume 14 including 3 preexisting drives 10 and 3 added drives 12. The instantaneous OCE technique is implemented by receiving updated RAID configuration information (metadata) through the user interface 110. The updated RAID configuration information is loaded into the RAID controller 114. This is the only reconfiguration needed to implement the instantaneous OCE technique illustrated in FIGS. 1-2. More specifically, the data blocks on the preexisting drives 10 do not have to be rewritten and the RAID controller 114 operates as originally configured, altered only in accordance with the updated metadata entered through the user interface 110. Because the added volume 12 has the same number of drives as the preexisting volume 10 organized as vertical expansion of the preexisting drives, the updated metadata merely specifies an increase in the size of the drives in the preexisting volume 10. The RAID controller 114 operates as previously configured, altered only by the updated metadata. It is contemplated that RAID controller 114 may be a hardware entity including a processing unit, memory, firmware, and a network interface and may be configured for operating as a software RAID system.

Figure 4:
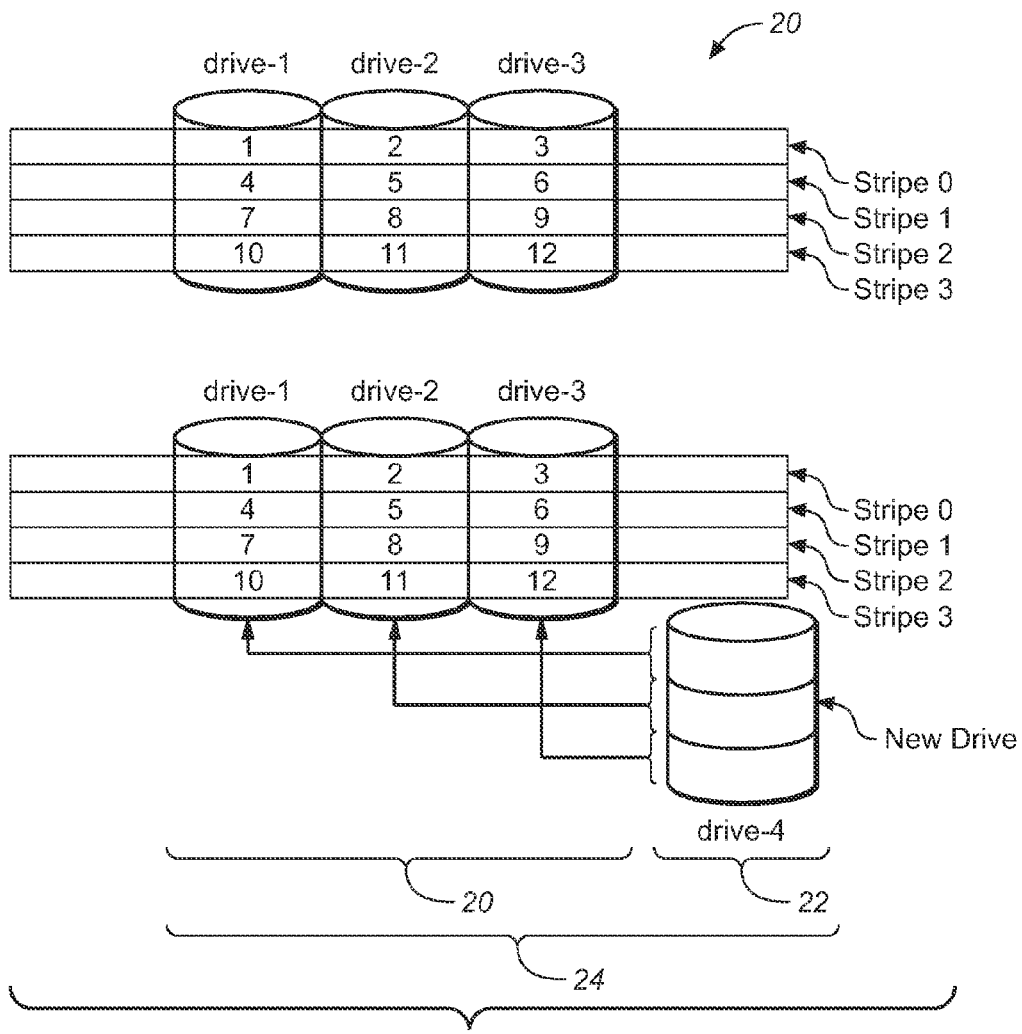
FIG. 4 is a data block layout diagram illustrating vertical OCE of a non-redundant RAID-0 volume.

FIG. 4 is a data block layout diagram illustrating vertical OCE of a RAID-0 volume. In this example, the preexisting volume 20 includes drive-1 through drive-3 divided into 4 stripes, stripe-0 through stripe-3, with each stripe including a block on each drive. Each stripe includes three data blocks because parity blocks are not included for redundancy in RAID-0 arrays. More specifically, stripe-0 includes data block-1 on drive-1, data block-2 on drive-2, and data block-2 on drive-3. Stripe-1 includes data block-4 on drive-1, data block-5 on drive-2, and data block-6 on drive-3. Stripe-2 includes data block-7 on drive-1, data block-8 on drive-2, and data block-9 on drive-3. Stripe-3 includes data block-10 on drive-1, data block-11 on drive-2, and data block-12 on drive-3.

Figure 5:
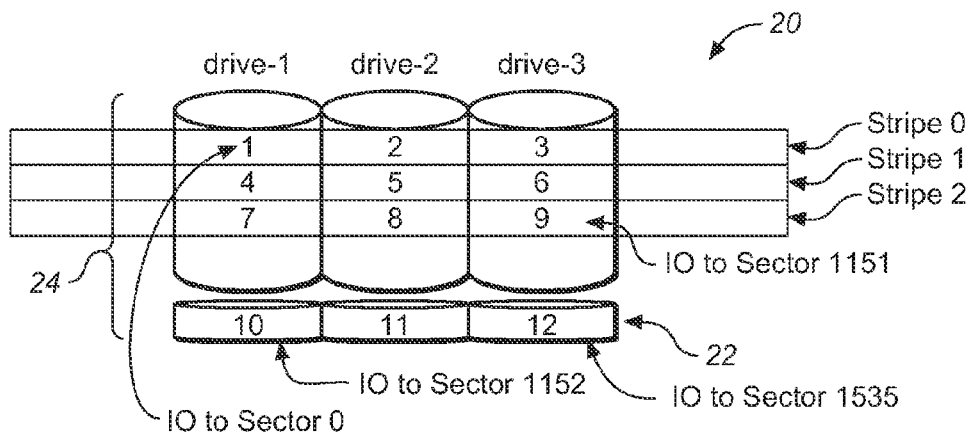
FIG. 5 is a data block layout diagram illustrating IO block continuity in the vertically expanded RAID-0 volume of FIG. 4.

A new drive 22 is broken into 3 partitions of equal size and one of three partitions is allocated to each preexisting drive to create the augmented volume 24. FIG. 5 is a data block layout diagram illustrating IO block continuity in the vertically expanded RAID-0 volume of FIG. 4. To handle the IO requests after instantaneous OCE on the non-redundant RAID-0 volume, the RAID controller manages the added capacity as if a factor of blocks has been added to the preexisting physical drives, with one factor added to each preexisting physical drive. The factor of blocks is determined by the number of drives already existing in the RAID volume. For the example shown in FIG. 5, the factor would be 3 for adding the new drive 22 to the preexisting 3 drive RAID-0 volume 20 to create the augmented RAID-0 volume 24.

To illustrate instantaneous OCE for a RAID-0 volume, FIG. 5 shows a 3 drive RAID-0 volume vertically expanded to a 4 drive RAID-0 volume. For explanatory purposes, an example is shown with each drive containing 384 sectors and a stripe size of 64 k. This produces 4 stripes in the preexisting RAID-0 volume 20 before the capacity expansion, as shown in FIG. 5. Prior to expansion, the preexisting volume 20 had a total of 1152 sectors. The added drive 22 has an additional 384 sectors, producing the expanded volume 24 with a total of 1536 sectors after OCE. If an IO request is issued to any of the first 1152 sectors, the preexisting set of 3 drives service the IO request. For example, an IO request falling on logical sector 1151 falls on the last sector of drive-3, as shown in FIG. 5. An IO request directed to any of the subsequent 384 sectors is serviced by the added drive 22, as shown in FIG. 5. As a specific example, consider an IO request to logical sector 1152. This request would fall on physical drive-3's sector 384. Since the original size of drive-3 is only 384 sectors, the request to logical sector 1152 is actually sent to sector 0 of the first partition of newly added drive-4 below drive-1 (i.e., physical sector 0 of the newly added drive-4 in the partition located below drive-1). Following the protocol through to its culmination, an IO request to logical sector 1535 would fall on sector 511 of physical drive-3. Since the drive-3 has only 384 sectors, the request actually falls on sector 127 of the third partition of the new volume 22, which is physical sector 383 of the newly added drive-4.

Figure 6:
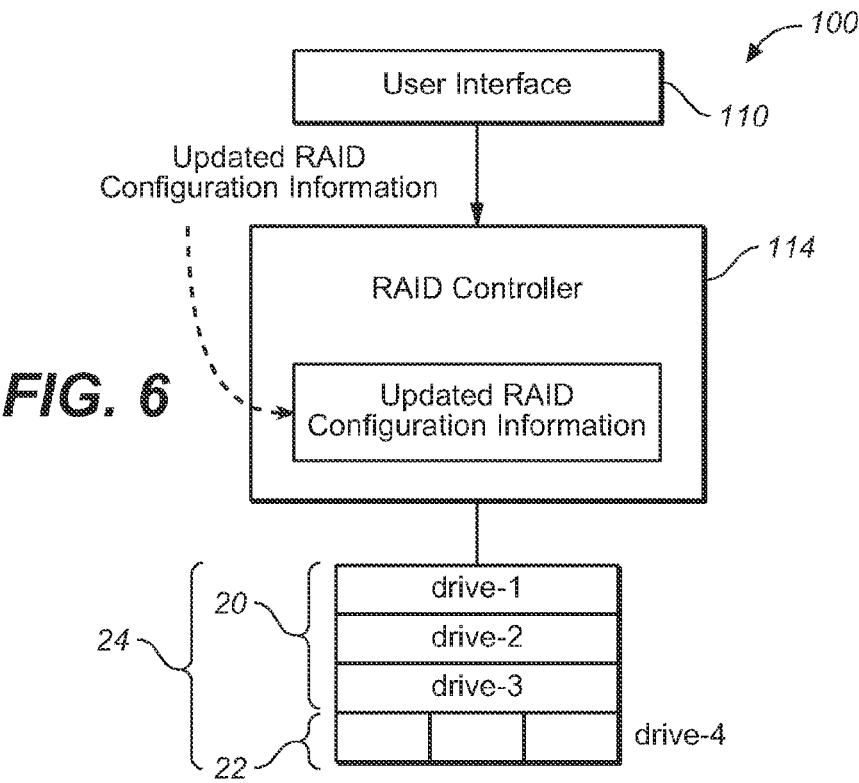
FIG. 6 is a functional block diagram of a computer system implementing vertical OCE of a RAID-0 array.

FIG. 6 is a functional block diagram of the computer system 100 implementing vertical OCE for the RAID-0 array of FIG. 4. The computer system 100 may be the same as the computer system 100 shown in FIG. 3 except that the RAID array is a RAID-0 array including an existing volume 20 of 3 drives and an added volume 22 of a single drive divided into 3 partitions, as discussed previously with reference to FIGS. 4-5. As in the RAID-5 system, the instantaneous OCE technique illustrated for the RAID-0 array in FIGS. 4-5 is implemented by receiving updated RAID configuration information (metadata) through the user interface 110. Again, the updated RAID configuration information is loaded into the RAID controller 114. This is once again the only reconfiguration needed to implement the instantaneous OCE technique illustrated in FIGS. 4-5. More specifically, the data blocks on the preexisting drives 20 do not have to be rewritten and the RAID controller 114 operates as originally configured, altered only in accordance with the updated metadata entered through the user interface 110. Because the added volume 22 has a partition assigned to each drive of the preexisting volume 20, the updated metadata merely appears as an increase in the size of the drives in the preexisting volume 20 and the RAID-0 controller 114 otherwise operates as previously configured.

Figure 7:
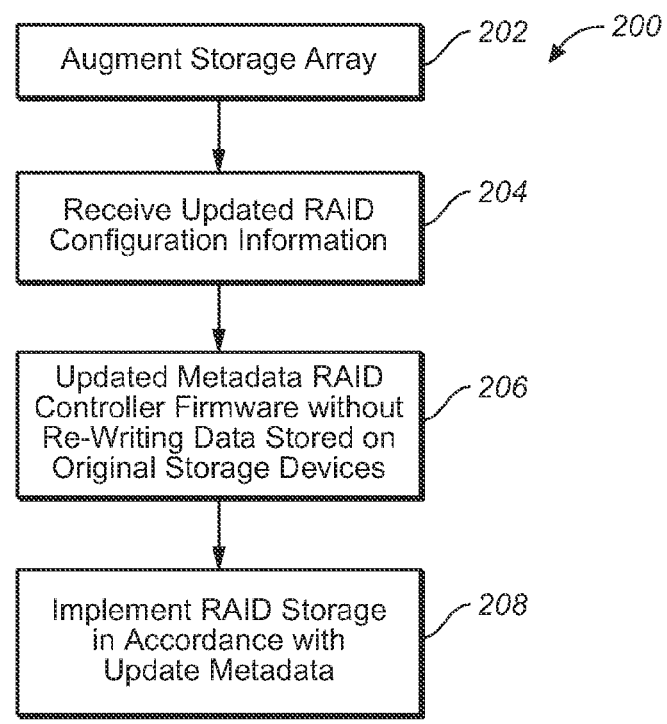
FIG. 7 logic block diagram illustrating instantaneous OCE in one embodiment of the present disclosure.

FIG. 7 is a diagram illustrating a method 200 for instantaneous OCE in one embodiment of the present disclosure. The method 200 is applicable to redundant RAID volumes (e.g. the RAID-5 volume shown in FIGS. 1-3) and non-redundant RAID volumes (e.g. the RAID-0 volume shown in FIGS. 4-6). In step 202, the RAID storage array is physically augmented. Typically a computer technician installs, and the host computer system receives, the additional storage. For example, a number of added drives equal to the number of preexisting drives are received into to a RAID-5 volume, as shown in FIGS. 1-3. As another example, a single drive may be received into a RAID-0 drive, in which the new drive is divided into a number of partitions equal to the number of preexisting drives, as shown in FIGS. 4-6. It is further contemplated step 202 may include detection of additional storage by the RAID controller.

In either case, the new drives are physically configured (e.g., RAID-5) or partitioned (e.g., RAID-0) to correspond to the physical configuration of the preexisting volume to accommodate configuration of the added storage as a vertical extension of the preexisting volume. Step 202 is followed by step 204, in which updated RAID configuration data (metadata) is received. Step 204 is followed by step 206, in which updated RAID configuration data received via the user interface is loaded into the firmware of the RAID controller without rewriting the data blocks stored on the original, preexisting storage devices. Step 206 is followed by step 208, in which RAID storage is implemented in accordance with the updated metadata stored in the firmware of the RAID controller. That is, the RAID controller operates as previously configured, altered only by the expanded size definition of the storage devices, to implement the instantaneous, vertical OCE of the RAID volume.

The examples of the disclosure described above may be embodied on optical or mechanical hard drives connected to the parallel system bus, as is currently the prevailing practice for RAID volumes. However, the disclosure could alternatively be applied to external USB drives connected to USB serial ports, which may be solid state, optical or any other suitable type storage medium. In this case, the instantaneous OCE system would work with an equivalent USB RAID controller. The disclosure also contemplates the integration of external USB storage devices with internal optical hard drives. In this case, the RAID controller is configured to assign the logical blocks across one or more internal drives connected to the parallel system bus and one or more eternal storage connected through one or more serial USB ports, which may be solid state, optical or any other suitable type storage medium. The disclosure further contemplates the integration of external drives connected through one or more parallel ports with one or more external drives connected through one or more USB serial ports, both with and without integration with one or more internal drives. Any of these storage devices may be solid state, optical or any other suitable type storage medium.

It is also contemplated that the present disclosure may consist (but not required to consist) of adapting or reconfiguring presently existing systems. Alternatively, original equipment may be provided embodying the disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access storage (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a storage such as volatile and non-volatile storage, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the disclosure is defined by the appended claims.

Although particular embodiments of this disclosure have been illustrated, it is apparent that various modifications and embodiments of the disclosure may be made by those skilled in the art without departing from the scope and spirit of the foregoing disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. An apparatus for implementing online capacity expansion for a RAID storage array in a host computer system, comprising:
    a computer comprising a user interface, the RAID storage array and a RAID controller comprising metadata defining RAID configuration information for the RAID storage array;
    wherein the RAID storage array comprises preexisting storage devices and one or more added storage devices, the preexisting storage devices having a number of logical volumes associated with each physical volume of the preexisting storage devices, and the one or more added storage devices having at least a physical volume;
    wherein the RAID controller is configured to receive metadata via the user interface comprising updated RAID configuration information and to store the updated RAID configuration information; and
    wherein the updated RAID configuration information is configured to vertically expand the RAID storage by integrating the physical volume of the one or more added storage devices with each physical volume of the preexisting storage devices without rewriting data blocks stored on the preexisting storage devices to accommodate the expansion and without increasing the number of logical volumes.

2. The apparatus of claim 1, wherein the RAID controller is further configured to update the RAID configuration information without powering down or rebooting.

3. The apparatus of claim 1, wherein the RAID storage array is a non-redundant RAID array.

4. The apparatus of claim 3, wherein the RAID storage array is a RAID-0 array.

5. The apparatus of claim 4, wherein:
    the RAID-0 array includes a number of preexisting storage devices; and
    the one or more added storage devices include a storage device divided into a number of partitions of approximately equal size with a partition corresponding to each logical volume of each preexisting storage device.

6. The apparatus of claim 4, wherein:
    the RAID-0 array consists essentially of number of preexisting storage devices; and
    the one or more added storage devices consist essentially of a single storage device divided into a number of partitions of approximately equal size with one partition corresponding to each logical volume of each preexisting storage device.

7. The apparatus of claim 1, wherein the RAID storage array is a redundant RAID array.

8. The apparatus of claim 7, wherein the RAID storage array is a RAID-5 array.

9. The apparatus of claim 8, wherein:
    the RAID-5 array includes a number of preexisting storage devices, the number of preexisting devices including at least three storage devices; and
    the one or more added storage devices includes an added storage device for each preexisting storage device.

10. The apparatus of claim 8, wherein:
    the RAID-5 array consists essentially of a number of preexisting storage devices; and
    the one or more added storage devices consist essentially of a number storage devices equal to the number of preexisting storage devices.

11. A method for implementing online capacity expansion in a host computer system comprising a user interface, a preexisting RAID storage array having a number of logical volumes and one or more physical volumes, a RAID controller comprising metadata defining RAID configuration information for the RAID storage array, comprising the steps of:
    receiving a physical addition of one or more storage devices to the RAID storage array;
    receiving metadata via the user interface comprising updated RAID configuration information;
    vertically expanding the RAID storage array by storing the updated RAID configuration information to integrate the added storage devices with the preexisting RAID storage array without rewriting data blocks stored on the preexisting RAID storage array and without changing the number of logical volumes of the preexisting RAID storage array accommodate the expansion; and
    storing data to the expanded RAID storage array.

12. The method of claim 11, further comprising the step of updating the RAID configuration information without powering down or rebooting.

13. The method of claim 11, wherein the RAID storage array is a non-redundant RAID array.

14. The method of claim 13, wherein the RAID array is a RAID-0 array.

15. The method of claim 14, wherein the RAID-0 array includes a number of preexisting storage devices and the one or more added storage devices include a storage device divided into a number of partitions of approximately equal size with a partition corresponding to each logical volume of each preexisting storage device.

16. The method of claim 14, wherein the RAID-0 array consists essentially of number of preexisting storage devices and the one or more added storage devices consist essentially of a single storage device divided into a number of partitions of approximately equal size with one partition corresponding to each logical volume of each preexisting storage device.

17. The method of claim 11, wherein the RAID storage array is a redundant RAID array.

18. The method of claim 17, wherein the RAID array is a RAID-5 array.

19. The method of claim 18, wherein the RAID-5 array includes a number of preexisting storage devices, the number of preexisting devices including at least three storage devices, and the one or more added storage devices includes an added storage device for each preexisting storage device.

20. The method of claim 18, wherein the RAID-5 array consists essentially of a number of preexisting storage devices and the one or more added storage devices consist essentially of a number storage devices equal to the number of preexisting storage devices.

* * * * *